United States Patent
Larsson et al.

(10) Patent No.: US 11,561,839 B2
(45) Date of Patent: Jan. 24, 2023

(54) ALLOCATION OF RESOURCES FOR A PLURALITY OF HOSTS

(71) Applicant: Telefonaktiebolaget LM Ericsson (publ), Stockholm (SE)

(72) Inventors: Tony Larsson, Väsby (SE); Ignacio Manuel Mulas Viela, Madrid (ES); Nicolas Seyvet, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 576 days.

(21) Appl. No.: 16/471,954

(22) PCT Filed: Dec. 21, 2016

(86) PCT No.: PCT/EP2016/082061
§ 371 (c)(1),
(2) Date: Jun. 20, 2019

(87) PCT Pub. No.: WO2018/113940
PCT Pub. Date: Jun. 28, 2018

(65) Prior Publication Data
US 2019/0317813 A1     Oct. 17, 2019

(51) Int. Cl.
G06F 9/46     (2006.01)
G06F 9/50     (2006.01)
G06F 17/14    (2006.01)
G06K 9/62     (2022.01)

(52) U.S. Cl.
CPC .......... G06F 9/505 (2013.01); G06F 17/142 (2013.01); G06K 9/6267 (2013.01)

(58) Field of Classification Search
CPC ................................ G06F 9/505; G06F 17/142
See application file for complete search history.

(56) References Cited

U.S. PATENT DOCUMENTS

| | | | | |
|---|---|---|---|---|
| 8,935,221 | B1 * | 1/2015 | Lazier ................. | G06F 11/2094 707/690 |
| 10,331,802 | B2 * | 6/2019 | Garvey ................ | G06F 16/285 |
| 10,476,742 | B1 * | 11/2019 | Szarvas ............... | H04L 41/0869 |
| 2004/0085339 | A1 * | 5/2004 | Divakaran ........... | G06V 20/40 715/721 |
| 2004/0221322 | A1 * | 11/2004 | Shen .................... | G06F 16/785 348/E5.103 |

(Continued)

OTHER PUBLICATIONS

Fletcher, Iain M, the effect of different dynamic stretch velocities on jump performance, Feb. 17, 2010, vol. 109 (3), p. 491-498.*

(Continued)

*Primary Examiner* — Camquy Truong
(74) *Attorney, Agent, or Firm* — Rothwell, Figg, Ernst & Manbeck, P.C.

(57) ABSTRACT

It is presented a method for enabling allocation of resources for a plurality of hosts. The method is performed by a server (1) and comprises identifying (S100) a service running on one or more of the plurality of hosts, determining (S140) a stretch factor for a recurring load pattern for the service running on the one or more of the plurality of hosts, and storing (S150) the identified service together with the determined stretch factor. It is also presented a server, a computer program and a computer program product.

21 Claims, 4 Drawing Sheets

(56) References Cited

U.S. PATENT DOCUMENTS

| | | | |
|---|---|---|---|
| 2009/0024572 A1* | 1/2009 | Mehta | G06F 16/24542 |
| 2011/0307115 A1 | 12/2011 | Pereira et al. | |
| 2017/0249763 A1* | 8/2017 | Garvey | G06F 17/18 |
| 2018/0173400 A1* | 6/2018 | Lehtiniemi | G06F 3/04815 |
| 2019/0317813 A1* | 10/2019 | Larsson | G06F 11/3051 |

OTHER PUBLICATIONS

Bender, Michael A. ; Muthukrishnan, S. ; Rajaraman, Rajmohan; Bender, Michael A. ; Muthukrishnan, S. ; Rajaraman, Rajmohan; 2004, vol. 7 (3), p. 195-222.*

International Search Report and Written Opinion issued in International Application No. PCT/EP2016/082061, dated Sep. 5, 2017, 11 pages.

Murugesan, P. et al., "A Comparative study on Dynamic Time Warping (DTW) and Arbitrary Selection Load Balancing (ASLB) Approaches to Heterogeneous P2P Networks", Int. J. Advanced Networking and Applications, vol. 05, Issue: 02, (Sep. 2013) pp. 1904-1907.

Jiang, X. et al., "Research of Load Balancing Algorithm Based on Resource Status for Streaming Media Transmission Network", International Conference on Consumer Electronics, Communications and Networks, IEEE, (Nov. 2013) pp. 503-507.

Gong, Z. et al., "PAC: Pattern-driven Application Consolidation for Efficient Cloud Computing", 2010 18th Annual IEEE/ACM International Symposium on Modeling, Analysis and Simulation of Computer and Telecommunication Systems, (2010) 10 pages.

Xin, R., "Graph X: A Resilient Distributed Graph System on Spark", ACM 2013, (6 pages).

Docker, www.docker.com, Dec. 20, 2016 (7 pages).

LinuxContainers.org, Infrastructure for container projects. Dec. 6, 2016 (2 pages).

Microservice architecture, microservices.io/index.htmi, Dec. 1, 2016 (7 pages).

Neo4j: The World's Leading Graph Database, www.neo4j.com, Dec. 14, 2016 (5 pages).

Orientdb, "OrientDB—The World's First and Fastest Distributed Multi-Model NoSQL Database", www.orientdb.com, Nov. 6, 2016 (3 pages).

Apache Spark, www.spark.apache.org, Dec. 14, 2016 (4 pages).

* cited by examiner

ALLOCATION OF RESOURCES FOR A PLURALITY OF HOSTS

CROSS REFERENCE TO RELATED APPLICATION(S)

This application is a 35 U.S.C. § 371 National Stage of International Patent Application No. PCT/EP2016/082061, filed Dec. 21, 2016, designating the United States.

TECHNICAL FIELD

The invention relates to a method for enabling allocation of resources for a plurality of hosts, and a server, a computer program and a computer program product thereof.

BACKGROUND

Cloud computing refers to a way of managing hardware equipment, making it easy to segment hosts, storage areas and network links. All the segmentations available for each of those technologies are not directly dependent on the cloud but they are heavily used in cloud environments in order to get the maximum utilization rate. Increased resource-usage efficiency and re-usability of available hardware makes cloud computing a very attractive solution for many companies nowadays. Therefore, cloud computing can be thought of as a way of managing hardware equipment to aggregate capacity and segment it in order to give service to multiple users.

There are three main resources required to achieve cloud computing: compute resources, networking resources and storage resources.

The compute resources represent the computing power available in the cloud. The compute resources give the user the ability to define the number of resources needed to fulfil his/her query in terms of Central Processing Unit (CPU) and Random Access Memory (RAM).

The networking resources represent the networking side in a deployment. The networking resources are currently developing rapidly and it allows cloud administrators to configure not only the virtual networking deployment but also the physical networking deployment. Software Defined Networking (SDN) may be used for networking deployment.

The storage resources represent the storage part in the running resources, i.e. virtual machines. The storage part in the running resources correspond to the disk and/or memory blocks used by the virtual machines or any kind of managed object using the persistent storage in the cloud. The storage resources can usually be configured to perform redundancy or distributed storage across different hosts.

Cloud computing components usually make use of different drivers, such as hypervisors and virtual switches, installed on hosts. A hypervisor or virtual machine monitor (VMM) is a piece of computer software, firmware or hardware that creates and runs Virtual Machines (VMs). A virtual switch is a logical switching fabric built into a VM infrastructure so that the Virtual Machines (VMs) can be networked wherever you need them.

Even though the majority of cloud deployments use virtualization of resources, virtualization is not strictly necessary and hence, cloud computing and virtualization can be de-coupled. Cloud computing can run in bare-metal in some occasions in order to avoid virtualization overheads and achieve better performance using other kinds of isolation systems like containers. Virtualization can also be used in other contexts than cloud computing.

Both mechanisms, containers and hypervisors, are different methods for achieving segmentation and better resource usage efficiency in the cloud infrastructure. Both containers and hypervisors are mainly used to achieve segmentation in order to divide the resources and achieve much higher usage-efficiency of the available physical resources, and also to achieve isolation of compute, networking and storage resources so these resources can be seen as treated as completely independent machines even though they are sharing the physical resources underneath.

Resource scheduling is a known problem in cloud computing. Resource schedulers are a part in the infrastructure that is aware of the available resources and responsible for deciding where to assign new processes or virtual services or VMs upon request.

The cloud computing paradigm has become a cornerstone for networks and services in which computing, networking and storage resources are hosted in interconnected and federated data centres. The infrastructure is made available on demand to operators, users and their applications.

FIG. 1 presents how various cloud levels typically are found in a data centre. Infrastructure as a Service (IaaS) utilizes the lowest four layers, Platform as a service (PaaS) utilizes all but the highest layer and Software as a service (SaaS) utilizes all eighth layers.

SUMMARY

It is an object of the invention to enable optimization of allocation of resources for a data centre.

According to a first aspect of the invention, there is presented a method for enabling allocation of resources for a plurality of hosts. The method is performed by a server and comprises identifying a service running on one or more of the plurality of hosts, determining a stretch factor for a recurring load pattern for the service running on the one or more of the plurality of hosts, and storing the identified service together with the determined stretch factor.

By the presented method, an ability to identify services running on different hardware is achieved.

The method may further comprise extracting host load data directly from the plurality of hosts, the host load data being related to the identified service.

The method may further comprise determining a load pattern for the identified service from the extracted host load data, and comparing the determined load pattern with similar load patterns to define a recurring load pattern. The comparing may comprise calculating dominant frequencies of load patterns. The dominant frequencies may be calculated by a Fast Fourier Transform (FFT).

The stretch factor may associate a first load pattern having a first time series of a first length to a second load pattern having a second time series of a second length different from the first length, and wherein the first time series and the second time series have the same key characteristics.

The stretch factor may be determined by Dynamic Time Warping (DTW).

The stretch factor may be determined by both comparing the identified load pattern with similar load patterns and comparing similar load patterns with the identified load pattern.

The method may further comprise training a classifier with the identified service normalized with the determined stretch factor.

The method may further comprise training a classifier with the identified service and with the determined stretch factor.

The method may further comprise predicting a load pattern for a service, utilizing the trained classifier.

The method may further comprise removing stored load patterns when obsolete.

The plurality of hosts may be a plurality of physical hosts, and the allocation of resources may be an allocation of physical resources. The host load data may be physical host load data.

The plurality of hosts may be a plurality of virtual hosts, and the allocation of resources may be an allocation of virtual resources. The host load data may be virtual host load data.

According to a second aspect of the invention, there is presented a server for enabling allocation of resources for a plurality of hosts. The server comprises a processor and a computer program product. The computer program product stores instructions that, when executed by the processor, causes the server to identify a service running on one or more of the plurality of hosts, determine a stretch factor for a recurring load pattern for the service running on the one or more of the plurality of hosts, and to store the identified service together with the determined stretch factor.

The server may further be caused to extract host load data directly from the plurality of hosts, the host load data being related to the identified service. The server may further be caused to determine a load pattern for the identified service from the extracted host load data, and to compare the determined load pattern with similar load patterns to define a recurring load pattern. The compare may comprise calculate dominant frequencies of load patterns. The dominant frequencies may be calculated by a Fast Fourier Transform (FFT).

The stretch factor may associate a first load pattern having a first time series of a first length to a second load pattern having a second time series of a second length different from the first length, and wherein the first time series and the second time series have the same key characteristics.

The stretch factor may be determined by Dynamic Time Warping (DTW).

The stretch factor may be determined by both comparing the identified load pattern with similar load patterns and comparing similar load patterns with the identified load pattern.

The server may further be caused to train a classifier with the identified service normalized with the determined stretch factor.

The server may further be caused to train a classifier with the identified service and with the determined stretch factor.

The server may further be caused to predict a load pattern for a service, utilizing the trained classifier.

The server may further be caused to remove stored load patterns when obsolete.

The plurality of hosts may be a plurality of physical hosts, and the allocation of resources may be an allocation of physical resources. The host load data may be physical host load data.

The plurality of hosts may be a plurality of virtual hosts, and the allocation of resources may be an allocation of virtual resources. The host load data may be virtual host load data.

According to a third aspect of the invention, there is presented a server for enabling allocation of resources for a plurality of hosts. The server comprises a determination manager for identifying a service running on one or more of the plurality of hosts, determining a stretch factor for a recurring load pattern for the service running on the one or more of the plurality of hosts, and for storing the identified service together with the determined stretch factor. The server may comprise a classify manager for training a classifier with the identified service normalized with the determined stretch factor, or for training a classifier with the identified service and with the determined stretch factor.

According to a fourth aspect of the invention, there is presented a computer program for enabling allocation of resources for a plurality of hosts. The computer program comprises computer program code which, when run on a server, causes the server to identify a service running on one or more of the plurality of hosts, determine a stretch factor for a recurring load pattern for the service running on the one or more of the plurality of hosts, and to store the identified service together with the determined stretch factor.

According to a fifth aspect of the invention, there is presented a computer program product comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
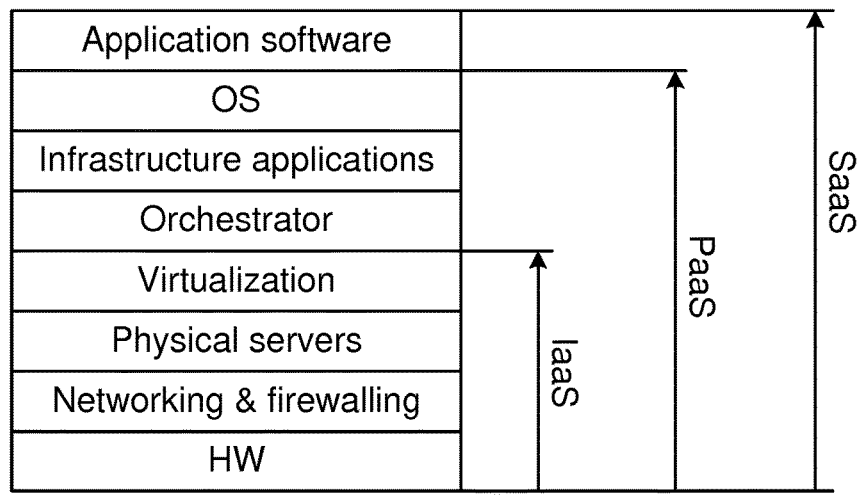
FIG. 1 is a schematic diagram illustrating layers in a cloud model.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Cloud systems require elastic resource allocation to minimize resource-provisioning costs while meeting Service Level Objectives (SLOs). As such it is critical for Data Centre users to allocate just enough resources to meet the application requirements while minimizing the costs incurred by a pay-as-you-go model. Cloud computing resources may comprise one or more of the following types: core of a central processing unit (CPU core), memory, disc usage, incoming network traffic, and outgoing network traffic.

However, cloud services have different running requirements and it is not always the case that the IaaS provided knows what is running where. For example, an infrastructure operator can pinpoint all Virtual Machines (VMs) and containers on physical hosts but not what is actually running within the virtualized resources.

There exist different methods to identify what is actually running within the virtualized resources, like for instance by deploying an agent within the VM/container. But such methods are intrusive as they are injected within the space of the VM/container user.

A potential non-intrusive approach is to study host loads, i.e. the loads generated on the physical hosts by the virtual applications (VMs or containers). However, since hardware across different infrastructure varies (different CPUs, memory size/speed, disks, etc.), a similar application run on different infrastructure will produce different load patterns if the hardware is different, and result in different performance. It is thus hard to classify what is running where.

A solution presented herein enables an automated, non-intrusive approach to handle classification of an application (i.e. what is running where) across different hardware configurations in a cloud environment.

Choosing the correct amount of resources for a particular workload is a complex task when using a single host and a specific hardware. Cloud solutions make this both simpler and more complex. Simplicity comes from not having to manage the physical infrastructure and the dynamic provisioning of on-demand resources. Complexity is increased by jittering introduced by virtualization, sharing (contention) of resources between different tenants on the same physical resources, and not knowing which hardware is behind an IaaS.

An embodiment of a method for classifying different applications using an application-agnostic, black box approach is presented that can be applied in large data centres. The embodiment relies on extracting Quality of Service (QoS) metrics directly from host load data (e.g. CPU utilization), on light-weight signal processing (e.g. Dynamic Time Warping (DTW)) to identify recurring application patterns or signatures, and to produce classifiable, multi-dimensional data sets that can be used to reliably recognize applications across different hardware (i.e. what is running where).

As a result, by identifying different applications across different virtualized infrastructure, a data centre user can tune its resources to better match the workload and costs. Or a cloud provider can optimize workloads over various hardware deployments.

The embodiments of methods presented herein can handle black-box systems as well as white-box systems. They can continuously tracks dynamic resource requirements of applications in an unobtrusive way and predict what is running where.

To be able to classify applications, or combination of applications, regardless of hardware configuration the following steps may be taken:
identify recurring load patterns, estimate a stretch factor by using DTW and determine stretch factor, and classify application.

Figure 2:
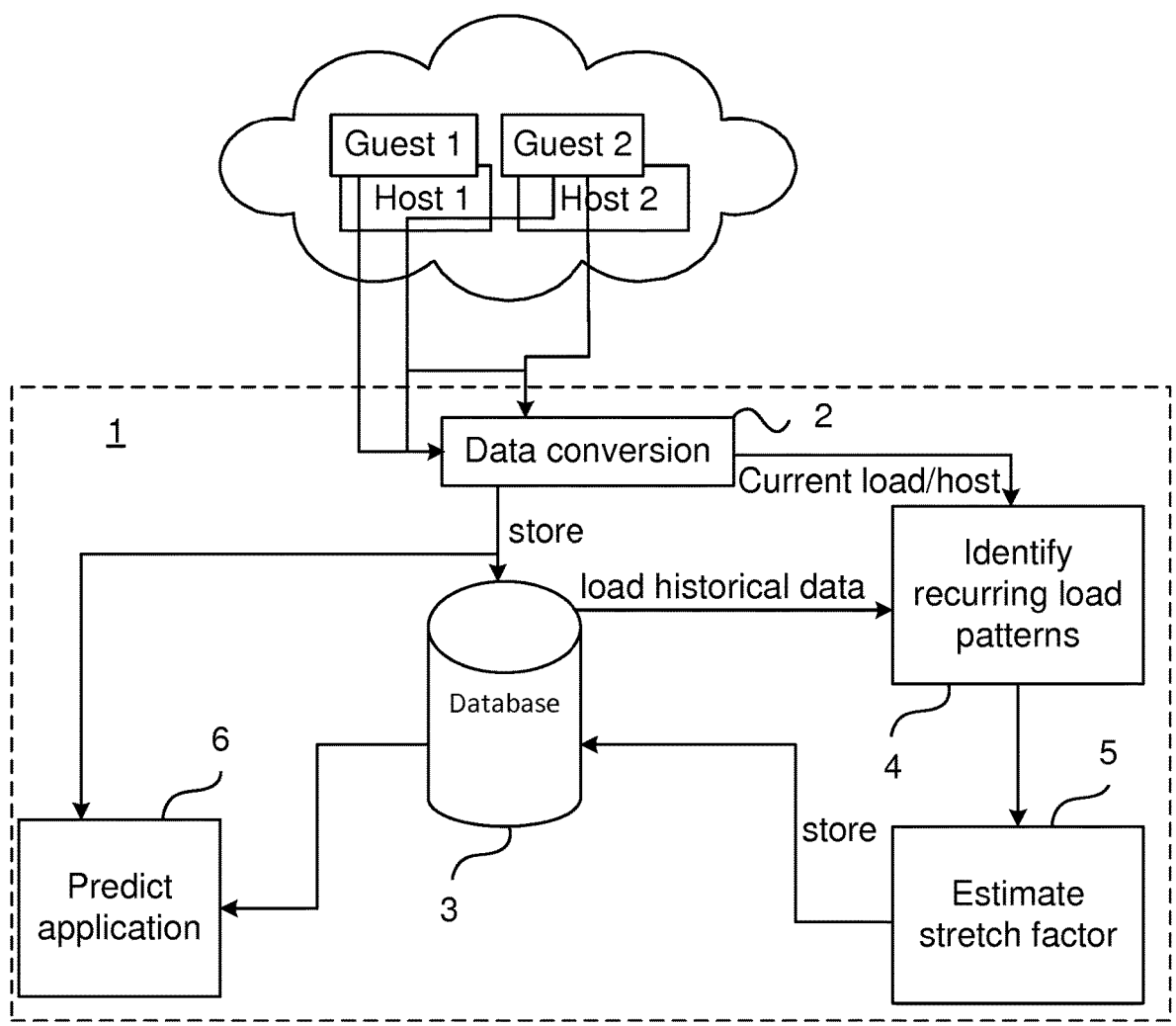
FIG. 2 is a schematic diagram illustrating an environment where embodiments presented herein can be applied.

FIG. 2 schematically illustrates an environment where an embodiment of a method can be applied. The hosts 1 and 2 may be virtual hosts and/or physical host. The guests 1 and 2 are applications, which may be VMs running on one or more physical host, or other applications running on one or more VMs. The applications and host load data after any required data conversion 2 are stored in a database 3. To identify recurring load patterns 4 of guests 1 and/or 2, on the hosts 1 and/or 2, both current load/host data as well as historical load/host data are used. Based on this a stretch factor is estimated 5, which is stored in the database 3 together with the related application. Load on the hosts 1 and/or 2 can thereafter be predicted 6, utilizing current data, and historical data from the database.

The embodiment identifies repeating resource usage patterns. These patterns are often caused by repeating requests in a particular sequence, over time, or iterative computations. These patterns may be called the signature of an application (or of a set of applications) running on a physical host.

The embodiment needs to be able to extract and pipe the host load data information (such as CPU, memory, I/O, local interrupt counters, etc.) on a per-physical node basis towards a time-series capable storage, and to have access to an analytics engine. These metrics are then used as time-series data sets of varying length.

To avoid making assumptions about the length of a repeating pattern, the embodiment uses Fast Fourier Transform (FFT) to calculate dominant frequencies of resource-usage variation in the observed data set. This is applied to each feature from the physical node. Starting from a resource-usage time series L, the FFT determines coefficients that represent the amplitude of each frequency component f. The dominant frequencies are those with the highest signal power. If multiple dominating frequencies have similar amplitude, the lowest dominating frequency is selected, thereby finding the longest observed repeating pattern. The FFT thus provides the dominant frequency $f_d$.

Given $f_d$, a pattern window size W can be defined in the following way:

$$W=(1/f_d)r$$

where r is the sampling rate.

The original dataset L (or time series) composed of the metrics stream is split into T=L/W pattern windows: $P_1$, $P_2$, ..., $P_T$.

The next step is to detect whether the pattern windows contain repeating patterns. Different methods can be used to evaluate similarity between window pairs $P_i$ and $P_j$: Pearson product-moment correlation coefficient, spearman rank correlation coefficient, or distance correlation (dCor). If all pattern windows are similar, the resource time series are flagged as having repeating behaviour, and an average value of the samples in each position of the pattern windows is used.

Note that the length of the time series window L is not necessarily a multiple of the application length W. This means that even if an application pattern has been found, the embodiment still needs to determine a stretch factor via e.g. Dynamic Time Warping (DTW).

Figure 3:
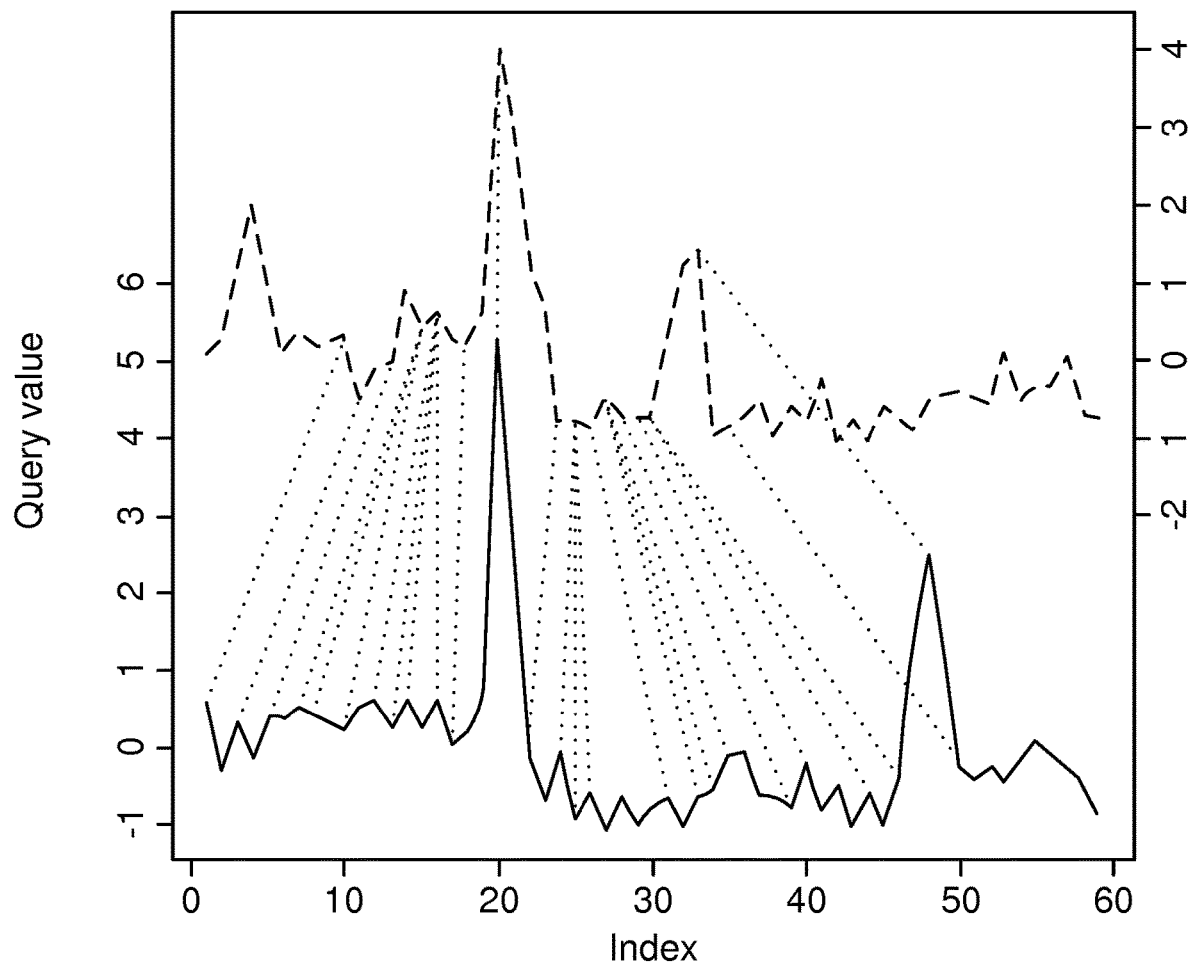
FIG. 3 is a schematic diagram illustrating stretched time series according to an embodiment presented herein.

The capability to identify the same services (or combinations of same services), even though they are running on different hardware and therefore have different patterns, to infer a stretch factor between the same services (or combination of services) running on different hardware/conditions. The idea of the stretch factor is that the same services have the same patterns but they are stretched (in time) versions of each other, which is illustrated in FIG. 3. A service running on a slow machine would have a longer pattern compared to the same service running on a fast machine. The time axis is more or less stretched out to be longer. Key characteristics of the pattern, such as number of peaks, height of peaks etc., are however the same. In FIG. 3 the lower pattern illustrated in a solid line is longer, i.e. running on a slower machine, compared to the upper pattern illustrated in s dashed line.

Finding and inferring a stretch factor between all similar patterns can be accomplished utilizing DTW. DTW measures similarity between two temporal sequences which may vary in speed or time. Any element in an accumulated DTW matrix indicates the dynamic time warping distance between series $P_i$ and $P_j$.

Once an application S with size W is found, the last T measurement samples are retrieved to form a time series S'. Since S and S' are similar but time-shifted, the DTW algorithm will determine an alignment therebetween. The result is the minimum distance mapping from S' to S. This allows predicting a point-to-point mapping between S' and S, which in turn allows the algorithm to find the position of the current value (i.e. the last point on S') on the application S.

The embodiment makes the point that the dynamic mapping from S' to S, i.e. the stretch factor, is correlated with, the resources allocated to the application from the perspective of the host. To simplify, a server with a 2×CPU capability will run an application a stretch factor times faster than a server with 1×CPU capability.

The described process for determining the stretch factor is applied on detected pattern applications against all know pattern applications, and on all known pattern applications against detected applications. In other words, the matching is attempted in the two directions. This may be performed, since only one of the directions is a valid stretch, which is not known in advance.

In other words, the DTW may be used bi-directionally, once the application patterns are learnt, they are stored, and as a result, when a new application pattern is identified, a stretch factor can be estimated, or if no stretch factor can be estimated, then this may be a non-stored application pattern.

For clean-up and to reduce complexity of an application pattern a stretch factor database, obsolete application patterns and stretch factors may be removed. Such a removal of obsolete load patterns may be done either using a predefined time limit or, by removing application patterns that have lost their predictive power (i.e. they are not re-used during a predefined period of time).

This results in a large selection of data that is grouped into same services (or combinations of services) as well as a stretch factor between services in the same group.

The identified application patterns may e.g. be used in two different ways to train a classifier that should be able to classify new unseen data.

Unsupervised Learning Approach

The stretch factor is used to normalize all patterns to the same stretch factor before training of the classifier. This provides the advantage to include all patterns regardless of stretch when training the classifier that will be able to classify services.

New samples will then be put through the same process and be normalized before the classification.

Classification in this approach is an unsupervised learning problem in the sense that all normalized patterns are clustered and similar patterns end up in the same cluster.

Once the model is trained, classifying new services is more or less the problem of checking which cluster the new sample is closest to. This can for instance be done using K nearest neighbour (knn).

Labels are not necessarily needed but will of course be helpful to describe the different clusters.

Supervised Learning Approach

Data is kept as-is. The stretch-factor is included as a new feature to describe the data.

The data is labelled with labels capturing the different services, such as web-server, Spark, Flink etc. This assumes that the label for each class is known for at least one specific stretch factor. Then this information is used to automatically label all other data belonging to the same class regardless of stretch factor.

This data is then used in a supervised learning problem to train a classifier that can classify new data. Any existing machine learning algorithm can be used for this, such as Random Forest, SVM etc. The fact that the same service is described with data that has different stretch factors will create a model that generalizes well.

Figure 4:
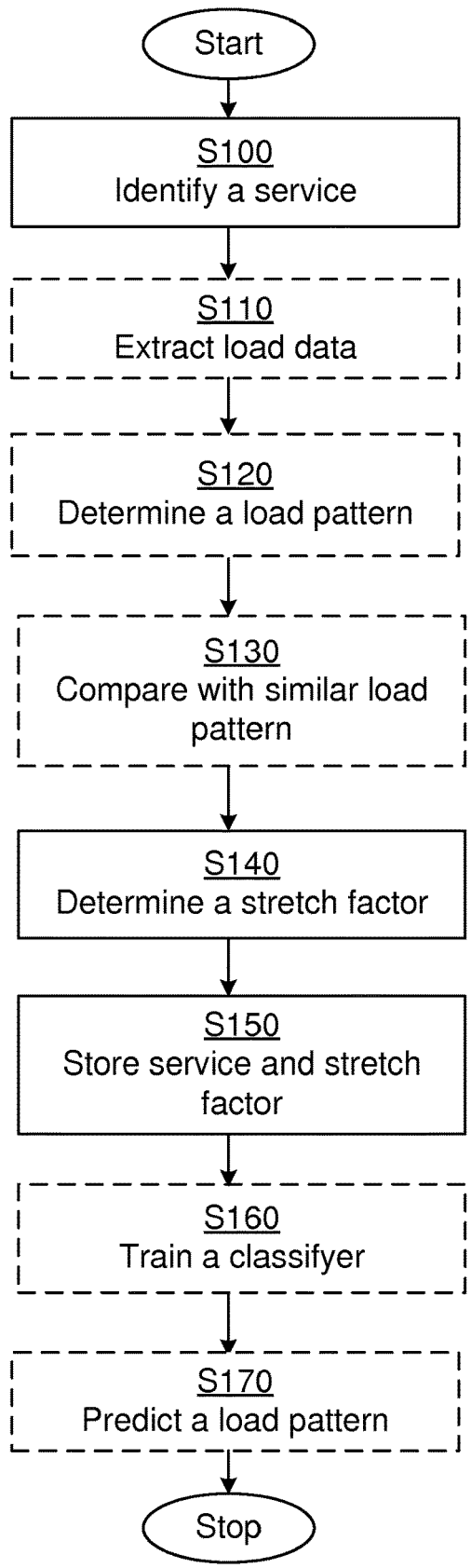
FIG. 4 is a flow chart illustrating methods according to embodiments presented herein.
Figure 5:
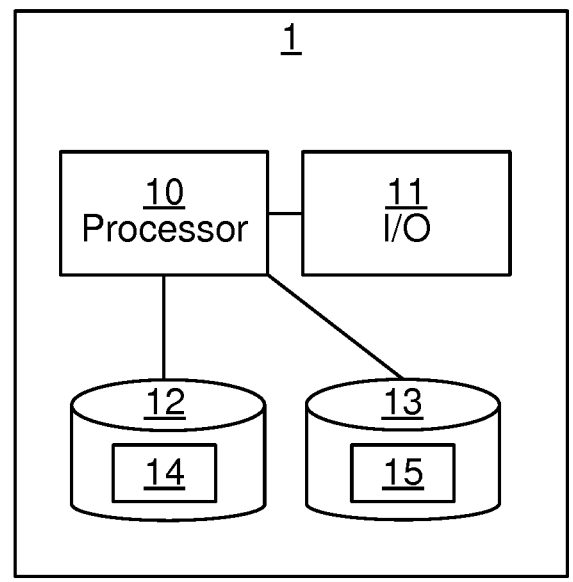
FIG. 5 is a schematic diagram illustrating some components of a server according to an embodiment presented herein.

A method, according to an embodiment, for enabling allocation of resources for a plurality of hosts, is presented with reference to FIG. 4, which method is performed by a server 1 with reference to FIG. 5. The method comprises the steps of identifying S100 a service running on one or more of the plurality of hosts, determining S140 a stretch factor for a recurring load pattern for the service running on the one or more of the plurality of hosts, and storing S150 the identified service together with the determined stretch factor.

The method may further comprise the step of extracting S110 host load data directly from the plurality of hosts, the host load data being related to the identified service. The method may further comprise the steps of determining S120 a load pattern for the identified service, and comparing S130 the determined load pattern with similar load patterns to define a recurring load pattern. The comparing step S130 may comprise calculating dominant frequencies of load patterns. The dominant frequencies may be calculated by a Fast Fourier Transform (FFT).

The stretch factor may associate a first load pattern having a first time series of a first length to a second load pattern having a second time series of a second length different from the first length, and wherein the first time series and the second time series have the same key characteristics.

The stretch factor may be determined by Dynamic Time Warping (DTW).

The stretch factor may be determined by both comparing the identified load pattern with similar load patterns and comparing similar load patterns with the identified load pattern.

The method may further comprise a step of training S160 a classifier with the identified service normalized with the determined stretch factor.

The method may further comprise a step of training S160 a classifier with the identified service and with the determined stretch factor.

The method may comprise the further step of predicting S170 a load pattern for a service, utilizing the trained classifier.

The method may further comprise a step removing stored load patterns when obsolete.

The plurality of hosts may be a plurality of physical hosts, and the allocation of resources may be an allocation of physical resources. The host load data may be physical host load data.

The plurality of hosts may be a plurality of virtual hosts, and the allocation of resources may be an allocation of virtual resources. The host load data may be virtual host load data.

The different steps of the presented embodiments of the method performed by the server 1, may be performed by an action directly by the server with own computing resources, or cloud based with other computing resources in the cloud. The server 1 may for some hosts act as a dedicated server and for other hosts act in a distributed manner.

A server 1, according to an embodiment, is presented with reference to FIG. 5, which server is configured to enable allocation of resources for a plurality of hosts. The server 1 comprises: a processor 10 and a computer program product 12, 13 storing a computer program 14, 15 with instructions that, when executed by the processor 10, causes the server 1 to identify S100 a service running on one or more of the plurality of hosts, determine S140 a stretch factor for a recurring load pattern for the service running on the one or more of the plurality of hosts, and to store S150 the identified service together with the determined stretch factor.

FIG. 5 is a schematic diagram showing some components of the server 1. The processor 10 may be provided using any combination of one or more of a suitable central processing unit (CPU), multiprocessor, microcontroller, digital signal processor (DSP), application specific integrated circuit etc., capable of executing software instructions of a computer program 14 stored in a memory. The memory can thus be considered to be or form part of the computer program product 12. The processor 10 may be configured to execute methods described herein with reference to FIG. 4.

The memory may be any combination of read and write memory (RAM) and read only memory (ROM). The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory 13 can be any combination of read and write memory (RAM) and read only memory (ROM) and may also comprise persistent storage, which, for example, can be any single one or combination of magnetic memory, optical memory, solid state memory or even remotely mounted memory. The data memory 13 may e.g. hold other software instructions 15, to improve functionality for the server 1.

The server 1 may further comprise an I/O interface ii including e.g. a user interface. Other components of the network device are omitted in order not to obscure the concepts presented herein.

The server may further be caused to extract Silo host load data directly from the plurality of hosts, the host load data being related to the identified service. The server may further be caused to determine S120 a load pattern for the identified service, and to compare S130 the determined load pattern with similar load patterns to define a recurring load pattern. The compare may comprise calculate dominant frequencies of load patterns. The dominant frequencies may be calculated by a Fast Fourier Transform (FFT).

The stretch factor may associate a first load pattern having a first time series of a first length to a second load pattern having a second time series of a second length different from the first length, and wherein the first time series and the second time series have the same key characteristics.

The stretch factor may be determined by Dynamic Time Warping (DTW).

The stretch factor may be determined by both comparing the identified load pattern with similar load patterns and comparing similar load patterns with the identified load pattern.

The server may further be caused to train S160 a classifier with the identified service normalized with the determined stretch factor.

The server may further be caused to train S160 a classifier with the identified service and with the determined stretch factor.

The server may further be caused to predict S170 a load pattern for a service, utilizing the trained classifier.

The server may further be caused to remove stored load patterns when obsolete.

The plurality of hosts may be a plurality of physical hosts, and the allocation of resources may be an allocation of physical resources. The host load data may be physical host load data.

The plurality of hosts may be a plurality of virtual hosts, and the allocation of resources may be an allocation of virtual resources. The host load data may be virtual host load data.

Figure 6:
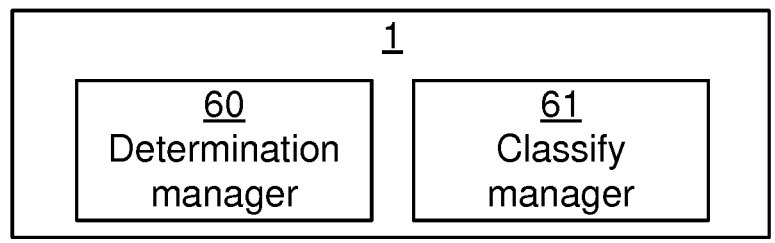
FIG. 6 is a schematic diagram showing functional modules of a server according to an embodiment presented herein.

FIG. 6 is a schematic diagram showing functional blocks of the server 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 4, comprising a determination manager unit 60 and a classify manager unit 61. In the embodiments where one or more of the modules are implemented by a computer program, then it shall be understood that these modules do not have to correspond to programming modules, but can be written as instructions according to the programming language in which they would be implemented, since some programming languages do not typically contain programming modules.

The determination manager 60 is for enabling allocation of resources for a plurality of hosts. This module corresponds to the identify step S100, extract step S110, the determine step S120, the compare step S130, the determine step S140 and the store step S150 of FIG. 4. This module can e.g. be implemented by the processor 10 of FIG. 5, when running the computer program.

The classify manager 61 may be for enabling allocation of resources for a plurality of hosts. This module corresponds to the train step S160 and the predict step S170 of FIG. 4. This module can e.g. be implemented by the processor 10 of FIG. 5, when running the computer program.

A computer program 14, 15 for enabling allocation of resources for a plurality of hosts is presented. The computer program comprises computer program code which, when run on a server 1, causes the server to identify S100 a service running on one or more of the plurality of hosts, determine S140 a stretch factor for a recurring load pattern for the service running on the one or more of the plurality of hosts, and to store S150 the identified service together with the determined stretch factor.

A computer program product 12, 13 comprising a computer program 14, 15 and a computer readable storage means on which the computer program is stored is also presented.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling allocation of resources for a plurality of hosts, the method being performed by a server and comprising:
identifying a service running on one or more of the plurality of hosts;
determining a stretch factor for a recurring load pattern for the service running on the one or more of the plurality of hosts;
storing an identifier identifying the identified service together with the determined stretch factor, wherein the stretch factor associates a first load pattern having a first time series of a first length to a second load pattern having a second time series of a second length different from the first length;
using the stretch factor to predict a load pattern for the service;
observing a load pattern; and
determining whether the service caused the observed load pattern, wherein the determining comprises comparing the predicted load pattern with the observed load pattern.

2. The method of claim 1, further comprising:
extracting host load data directly from the plurality of hosts, the host load data being related to the identified service.

3. The method of claim 2, further comprising:
determining a load pattern for the identified service from the extracted host load data; and
comparing the determined load pattern with similar load patterns to define a recurring load pattern, wherein
the comparing comprises calculating dominant frequencies of load patterns, and
the dominant frequencies are calculated by a Fast Fourier Transform (FFT).

4. The method of claim 1, wherein the first time series and the second time series have the same key characteristics.

5. The method of claim 1, wherein the stretch factor is determined by Dynamic Time Warping (DTW).

6. The method of claim 1, wherein the stretch factor is determined by both comparing the identified load pattern with similar load patterns and comparing similar load patterns with the identified load pattern.

7. The method of claim 1, comprising:
training a classifier with the identified service normalized with the determined stretch factor, and/or
training a classifier with the identified service and with the determined stretch factor.

8. The method of claim 7, comprising:
predicting a load pattern for the service, utilizing the trained classifier.

9. The method of claim 1, wherein the plurality of hosts are a plurality of virtual hosts, and the allocation of resources is an allocation of virtual resources.

10. A server for enabling allocation of resources for a plurality of hosts, the server comprising:
a processor; and
a computer program product storing instructions that, when executed by the processor, causes the server to:
identify a service running on one or more of the plurality of hosts;
determine a stretch factor for a recurring load pattern for the service running on the one or more of the plurality of hosts;
store an identifier identifying the identified service together with the determined stretch factor, wherein the stretch factor associates a first load pattern having a first time series of a first length to a second load pattern having a second time series of a second length different from the first length;
use the stretch factor to predict a load pattern for the service;
observe a load pattern; and
determine whether the service caused the observed load pattern by comparing the predicted load pattern with the observed load pattern.

11. The server of claim 10, further caused to:
extract host load data directly from the plurality of hosts, the host load data being related to the identified service.

12. The server of claim 11, further caused to:
determine a load pattern for the identified service from the extracted host load data; and
compare the determined load pattern with similar load patterns to define a recurring load pattern.

13. The server of claim 12, wherein the compare comprises calculate dominant frequencies of load patterns and the dominant frequencies are calculated by a Fast Fourier Transform (FFT).

14. The server of claim 10, wherein the first time series and the second time series have the same key characteristics.

15. The server of claim 10, wherein the stretch factor is determined by Dynamic Time Warping (DTW).

16. The server of claim 10, wherein the stretch factor is determined by both comparing the identified load pattern with similar load patterns and comparing similar load patterns with the identified load pattern.

17. The server of claim 10, further caused to:
train a classifier with the identified service and with the determined stretch factor, and/or
train a classifier with the identified service normalized with the determined stretch factor.

18. The server of claim 17, further caused to:
predict a load pattern for the service, utilizing the trained classifier.

19. The server of claim 11, wherein the plurality of hosts are a plurality of physical hosts, and the allocation of resources is an allocation of physical resources, and the host load data is physical host load data.

20. A computer program product comprising a computer program for enabling allocation of resources for a plurality of hosts, the computer program comprising computer program code which, when run on a server, causes the server to:
identify a service running on one or more of the plurality of hosts;
determine a stretch factor for a recurring load pattern for the service running on the one or more of the plurality of hosts;
store an identifier identifying the identified service together with the determined stretch factor, wherein the stretch factor associates a first load pattern having a first time series of a first length to a second load pattern having a second time series of a second length different from the first length;
use the stretch factor to predict a load pattern for the service;
observe a load pattern; and
determine whether the service caused the observed load pattern by comparing the predicted load pattern with the observed load pattern.

21. The method of claim 1, further comprising:
using the stretch factor to predict a load pattern for the service;
observing a load pattern;
determining whether the service caused the observed load pattern, wherein determining whether the service caused the observed load pattern comprises determining whether the predicted load pattern matches the observed load pattern.

* * * * *